United States Patent
Sandhage et al.

(10) Patent No.: US 11,352,681 B2
(45) Date of Patent: Jun. 7, 2022

(54) METHODS OF MANUFACTURING OXIDE/METAL COMPOSITE COMPONENTS AND THE COMPONENTS PRODUCED THEREFROM

(71) Applicant: Purdue Research Foundation, West Lafayette, IN (US)

(72) Inventors: Kenneth H. Sandhage, Lafayette, IN (US); Mario Raul Caccia, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 195 days.

(21) Appl. No.: 16/503,117

(22) Filed: Jul. 3, 2019

(65) Prior Publication Data
US 2020/0010928 A1    Jan. 9, 2020

Related U.S. Application Data

(60) Provisional application No. 62/842,298, filed on May 2, 2019, provisional application No. 62/693,824, filed on Jul. 3, 2018.

(51) Int. Cl.
  *C22C 1/10*    (2006.01)
  *C04B 35/653*    (2006.01)

(52) U.S. Cl.
  CPC .......... *C22C 1/1068* (2013.01); *C04B 35/653* (2013.01)

(58) Field of Classification Search
  CPC .......... C22C 1/1068; C22C 2001/1057; C04B 2235/616
  See application file for complete search history.

(56) References Cited

U.S. PATENT DOCUMENTS

2003/0054156 A1*  3/2003  Sandhage ............. C04B 35/622
                                                    428/307.7

OTHER PUBLICATIONS

Breyer english translation WO2001/056758A9 (Year: 2003).*

* cited by examiner

*Primary Examiner* — Anthony J Zimmer
*Assistant Examiner* — Ricardo D Morales
(74) *Attorney, Agent, or Firm* — Hartman Global IP Law; Gary M. Hartman; Domenica N. S. Hartman (57) ABSTRACT

Methods for producing components for use in high temperature systems that include reacting a fluid reactant and a porous preform that has a pore volume and contains a solid oxide reactant that defines a solid volume of the porous preform. The method includes infiltrating the fluid reactant into the porous preform to react with the solid oxide reactant to produce a oxide/metal composite component, during which a displacing metal replaces a displaceable species of the solid oxide reactant to produce at least one solid oxide reaction product that has a reaction product volume that at least partially fills the pore volume. The oxide/metal composite component includes at least one oxide phase and at least one metal phase. The component is exposed to temperatures greater than 500° C. and the at least one oxide phase and the at least one metal phase exhibit thermal expansion values within 50% of one another.

20 Claims, 1 Drawing Sheet

METHODS OF MANUFACTURING OXIDE/METAL COMPOSITE COMPONENTS AND THE COMPONENTS PRODUCED THEREFROM

CROSS REFERENCE TO RELATED APPLICATIONS

This application claims the benefit of U.S. Provisional Application Nos. 62/693,824, filed Jul. 3, 2018, and 62/842,298, filed May 2, 2019, the contents of which are incorporated herein by reference.

BACKGROUND OF THE INVENTION

The present invention generally relates to high temperature composites and components comprising such composites. The invention particularly relates to oxide/metal composite components, including but not limited to oxide/metal composite components capable of use in high temperature systems. The invention most particularly relates to mechanically-robust, thermally-robust, chemically-robust (corrosion resistant), oxidation-resistant, and thermally-matched oxide/metal composite components for use in high temperature systems.

Diffusion-bonded printed circuit heat exchangers are compact, plate type heat exchangers used in, for example, electricity-generating systems such as concentrated solar power (CSP) systems, nuclear power systems, and fossil-fuel-based power systems. The operation of such power systems involves the conversion of heat (derived from the sun, nuclear reaction, or the burning of fossil fuels) into electricity, which is usually conducted by transferring heat from a heated fluid (e.g., a molten salt, a molten metal, or hot combustion gases) through a primary heat exchanger to a "working fluid" (such as steam or carbon dioxide at elevated pressure). Expansion of the heated working fluid is then used to spin a turbine that is used to generate electricity. Due to their construction, diffusion-bonded printed circuit heat exchangers are particularly well suited for high pressure, high temperature applications more traditionally serviced by shell and tube heat exchangers, but in a much more compact and higher integrity unit. Briefly, diffusion-bonded printed circuit heat exchangers include an array of thermally-conductive pattern-etched metallic alloy plates which are stacked and diffusion bonded. However, due to material limitations of the metallic alloys (for example, stainless steels or Ni-based alloys) used to form the plates, power systems utilizing these heat exchangers are ordinarily limited to operating temperatures below about 600° C. Above this temperature, the metallic alloys tend to experience dramatic decreases in their mechanical properties (stiffness and creep resistance), so that the maximum allowed stresses for use of these alloys at elevated pressures decreases appreciably above about 600° C. There is a strong desire to operate such heat exchangers at temperatures well above 600° C., in order increase the thermal-to-electrical conversion efficiency of concentrated solar power (CSP) systems, nuclear power systems, and fossil-fuel-based power systems, and thereby lower the cost of electricity and reduce greenhouse gas emissions. Hence, compact heat exchangers comprising mechanically-robust, thermally-robust, and chemically-robust (corrosion resistant) materials capable of operation at higher temperatures than are possible with current metal alloys are needed. There is also a strong desire to produce such higher temperature compact heat exchangers with tailorable channel patterns via a cost-effective process.

As mentioned above, the operation of high-temperature electricity-generating systems, such as concentrated solar power (CSP) systems, nuclear power systems, and fossil-fuel-based power systems, involves the transfer of heat from a heated fluid (such as molten salts, molten metals, or hot combustion gases) through a primary heat exchanger to a working fluid that, in turn, is used to spin a turbine in order to generate electricity. A high temperature pump is needed to move the heated fluid through piping to the primary heat exchanger. There is a strong desire to increase the temperature of operation of such power systems in order to enhance the efficiency of converting heat to electricity, so as to thereby decrease the cost of electricity and reduce greenhouse gas emissions. Hence, pumps capable of operating at higher temperatures are needed. However, due to material limitations of metallic alloys (for example, stainless steels or Ni-based alloys) commonly used to form the pump components (impellers, shafts, etc.), these pumps are ordinarily limited to operating temperatures below about 550° C. Above this temperature, the metallic alloys tend to experience dramatic decreases in their mechanical properties (stiffness and creep resistance) and/or in their chemical properties (such as resistance to corrosion in oxidizing gases or reactive liquids). Hence, pump components comprising mechanically-robust, thermally-robust, and chemically-robust (corrosion resistant) materials capable of operation at higher temperatures than are possible with current metal alloys are needed. There is also a strong desire to produce such pump components in complex shapes via a cost-effective process.

For a number of high-temperature engine components, there is a significant need for materials with enhanced creep resistance, enhanced toughness, enhanced stiffness, enhanced erosion resistance, enhanced fracture resistance, enhanced thermal shock resistance, enhanced thermal cycling resistance, and enhanced corrosion resistance. Current advanced turbine blades for high temperature turbine engine operation are typically comprising single crystals of nickel-based superalloys that possess internal cooling channels and that contain a thermal barrier coating. The thermal barrier coating and internal cooling channels are used to lower the temperature of the nickel-based superalloy during operation of the turbine, so that the nickel-based superalloy can retain sufficiently high stiffness, creep resistance, fracture toughness, and corrosion resistance while operating the jet engine at high temperatures. In order to further increase the efficiency and performance of turbine engines, there is a desire to operate such turbine engines at higher temperatures than are presently used which, in turn, provides a strong desire to develop turbine blades (and other components in the hot section of the turbine) comprising materials capable of operation at higher temperatures than are possible with current metal alloy-based turbine blade materials. There is also a strong desire to produce such higher temperature turbine blades in complex shapes via a cost-effective process.

Accordingly, there is a desire for mechanically-robust, thermally-robust, and chemically-robust (corrosion resistant) components capable of being used in high temperature systems and in high pressure, high temperature systems at operating temperatures above 600° C. without a significant loss of stiffness or strength.

BRIEF DESCRIPTION OF THE INVENTION

The present invention generally provides mechanically-robust, thermally-robust, and chemically-robust (corrosion resistant) oxide/metal composite materials for high temperature applications, components comprising such oxide/metal composite materials, methods of manufacturing such components, and systems comprising such components.

According to one aspect of the invention, a method is provided for producing an oxide/metal composite component for use in a high temperature system. The method includes reacting a fluid reactant and a porous preform that has a pore volume and contains a solid oxide reactant that defines a solid volume of the porous preform. The fluid reactant includes at least one displacing metal and the solid oxide reactant of the preform includes at least one displaceable species. The at least one displacing metal of the fluid reactant is capable of displacing the at least one displaceable species in the solid oxide reactant to produce at least one solid oxide reaction product. The method includes allowing the fluid reactant to infiltrate the porous preform and react with the solid oxide reactant to produce the oxide/metal composite component, during which the at least one displacing metal at least partially replaces the at least one displaceable species of the solid oxide reactant to produce the at least one solid oxide reaction product that has a reaction product volume, the pore volume is at least partially filled by the reaction product volume, and the reaction product volume is greater than the solid volume lost by the at least one displaceable species in the solid oxide reactant being displaced by the at least one displacing metal of the fluid reactant during the reaction of the fluid reactant and the solid oxide reactant. The oxide/metal composite component includes an oxide/metal composite containing at least one oxide phase and at least one metal phase. The method includes exposing the oxide/metal composite component to temperatures greater than 500° C. in the high temperature system. The at least one oxide phase and the at least one metal phase exhibit thermal expansion values within 50% of one another upon heating to a temperature greater than 500° C.

Another aspect of the invention is the oxide/metal component produced by the method described above.

Technical effects of the component described above preferably include the ability to operate high temperature systems at temperatures in excess of 500° C.

Other aspects and advantages of this invention will be further appreciated from the following detailed description.

DETAILED DESCRIPTION OF THE INVENTION

The present invention generally provides oxide/metal composites and oxide/metal composite components, and most particularly oxide/metal composite components suitable for high temperature applications, methods of manufacturing such components, and systems comprising such components. Such high-temperature systems include, but are not limited to, systems for transportation, energy (e.g., electrical power) production, energy storage, waste heat recovery, propulsion, national defense, chemical processing, and chemical and waste storage. Such transportation systems include, but are not limited to, systems for automobiles, trucks, trains, aircraft, spacecraft, ships, and submarines. Such electrical power production systems include, but are not limited to, systems for fossil fuel-derived power, solar energy-derived power, nuclear energy-derived power, and thermionics. Such energy storage systems include, but are not limited to, systems for the storage of solids, liquids, gases, or plasmas. Such propulsion systems include, but are not limited to, systems for chemical fuel-based propulsion, nuclear fuel-based propulsion, and ion propulsion. Such systems for national defense include, but are not limited to, systems for hypersonic aircraft and hypersonic missiles. Such oxide/metal composite components suitable for use in such high temperature systems include, but are not limited to, heat exchangers, piping, valves, storage containers for high-temperature solids and fluids, pumps, bearings, heat sinks, liquid metal handling equipment, engine components (such as turbine blades, pistons, compressors, combustion chambers), leading edges of hypersonic aircraft and missiles, and energy conversion devices. Such oxide/metal composite components include, but are not limited to, components that need to be resistant to erosion at high temperatures. Such oxide/metal composite components include, but are not limited to, components that need to retain stiffness at high temperatures. Such oxide/metal composite components include, but are not limited to, components that need to avoid plastic deformation at high temperatures. Such oxide/metal composite components include, but are not limited to, components that need to be resistant to fracture at high temperatures. Such oxide/metal composite components include, but are not limited to, engine components (such as turbine blades, pistons, compressors, combustion chambers), bearings, gears, wheels, pulleys, components in drive trains, machining tools, grinding tools, welding tools, and components in braking systems. According to a nonlimiting aspect of the invention, such components may be manufactured to be near-net shape and near-net size, and exhibit desirable properties for such applications which may include high melting temperatures, high stiffness, high creep resistance, high erosion resistance, high thermal cycling and thermal shock resistance, high corrosion resistance, high thermal conductivity, high electrical conductivity, high oxidation resistance, thermally-matched components, and intricate, net-shape/size components.

A particular but nonlimiting example of a high temperature application capable of using an oxide/metal composite component within the scope of the invention comprises a heat exchanger in an advanced power cycle, such as a supercritical $CO_2$ Brayton cycle or a high temperature noble gas Brayton cycle, for application in and/or with other components included within a concentrated solar power (CSP) system. In CSP systems, solar energy is used to heat a high-temperature fluid (such as a molten salt) for transport and/or storage, and the heat from this fluid is transferred (through a primary heat exchanger) to a working fluid (such as supercritical steam or carbon dioxide) that is, in turn, used in a heat engine. The materials comprising such primary heat exchangers preferably are relatively stiff, mechanically robust, corrosion resistant, and thermally conductive. Replacing such components with the oxide/metal composite materials described herein enables the operation of the heat exchangers at higher temperatures than would ordinarily be possible with conventional metal alloys. Consequently, higher efficiencies can be achieved with a lower cost of generated electricity and a reduction in greenhouse gas emissions.

The development of high-temperature (≥750° C.), high-net-cycle-efficiency (>50%) supercritical $CO_2$ (s$CO_2$) closed Brayton power cycles would provide an important step towards the 2030 Sunshot targets of $0.05/kWh for a baseload concentrated solar power (CSP) plant and $0.10/kWh for a peaker CSP plant. However, limitations of current materials used in the primary heat exchanger (pHEX), for transferring heat from a molten salt to s$CO_2$ in the power block, have inhibited development of such high performance, low-cost CSP systems. Significant strength reductions above 600° C. of affordable structural metal alloys have led to a temperature ceiling in the use of such alloys for pHEXs operating with high-pressure s$CO_2$. Prior work by the current inventors has shown that a co-continuous ZrC/W composite (cermet) possesses attractive thermal and mechanical properties for such HEXs for heat transfer from molten chloride salts to s$CO_2$ at ≥750° C. (i.e., higher stiffness, more than on order of magnitude higher failure strength, and 2-3 times higher thermal conductivity, than stainless steels and Ni-based alloys ≥750° C.). Such composites can also be fabricated in desired HEX plate morphologies by cost-effective forming operations (e.g., tape-casting, compaction, stamping; without the need for chemical etching of channels) and then shape/size-preserving reactive melt infiltration. However, because ZrC/W cermets are not inherently oxidation resistant, additional steps (surface Cu layers, CO added to s$CO_2$) were used to achieve desired corrosion resistance in s$CO_2$ at ≥750° C. Thermal expansion differences between ZrC/W and Ni-alloy tubing also require additional interface tailoring to minimize thermal cycling stresses.

To overcome these complications, disclosed herein are pHEXs containing oxide/metal cermet materials that are inherently oxidation resistant, mechanically-robust, cost-effective (reaction-formed), and that possess a closer thermal expansion match to metal alloy tubing. These cermets allow for pHEXs of simpler design for reliable, high-performance heat transfer at ≥750° C. to s$CO_2$. Such robust, cost-effective oxide/metal cermets would also be attractive for other high-temperature CSP components (e.g., molten salt pump impellors, valves).

In particular, conventional metallic alloy-based printed circuit heat exchangers are limited to operating temperatures up to about 600° C. At higher temperatures, the mechanical properties (stiffness, creep resistance) of such metallic alloys dramatically degrade. In contrast, ceramic/metal composite materials described herein are anticipated to retain their stiffness and strength values well above 600° C. and to remain resistant to corrosion at temperatures well above 600° C.

A second particular but nonlimiting example of a high temperature application capable of using an oxide/metal component within the scope of the invention comprises a turbine blade for a jet engine turbine or for a turbine for a ground-based power plant. Current turbine blades for high temperature operation are typically comprising single crystals of nickel-based superalloys that possess internal cooling channels and that contain a thermal barrier coating. The thermal barrier coating and internal cooling channels are used to lower the temperature of the nickel-based superalloy during operation of the turbine, so that the nickel-based superalloy can retain sufficiently high stiffness, creep resistance, and fracture toughness while operating the jet engine at high temperatures. In order to further increase the efficiency and performance of turbine engines, there is a desire to operate such turbine engines at higher temperatures than are presently used which, in turn, provides a strong desire to develop turbine blades (and other components in the hot section of the turbine) comprising materials capable of operation at higher temperatures than are possible with current metal alloy-based turbine blade materials. There is also a strong desire to produce such higher temperature turbine blades in complex shapes via a cost-effective process.

A third particular but nonlimiting example of a high temperature application capable of using an oxide/metal component within the scope of the invention comprises components of a pump (e.g., impellor, rotor, shaft, housing) used to move a high temperature fluid utilized in a ground-based power plant for generating electricity. Current pump components are typically comprising stainless steels or nickel-based superalloys. The values of stiffness and creep resistance of such stainless steels and nickel-based superalloys degrade significantly above about 600° C. In order to further increase the efficiency and performance of electricity-generating power plants, there is a desire to operate such systems at higher temperatures than 600° C. which, in turn, provides a strong desire to develop pump components comprising materials capable of operation at higher temperatures than are possible with current metal alloy-based pump components. There is also a strong desire to produce such higher temperature pump components in complex shapes via a cost-effective process.

In order to manufacture oxide/metal composite components suitable for use in high temperature applications, and in particular having high melting temperatures, high stiffness, high fracture strength, high fracture toughness, high erosion resistance, high corrosion resistance, high thermal conductivity, and high electrical conductivity, the components are preferably formed to near-net shape and near-net dimensions by a displacive compensation of porosity (DCP) process. Such processes are described in detail in U.S. Pat. Nos. 6,407,022; 6,598,656; and 6,833,337 to Sandhage et al., the contents of all of which are incorporated herein by reference in their entirety.

Figure 1:
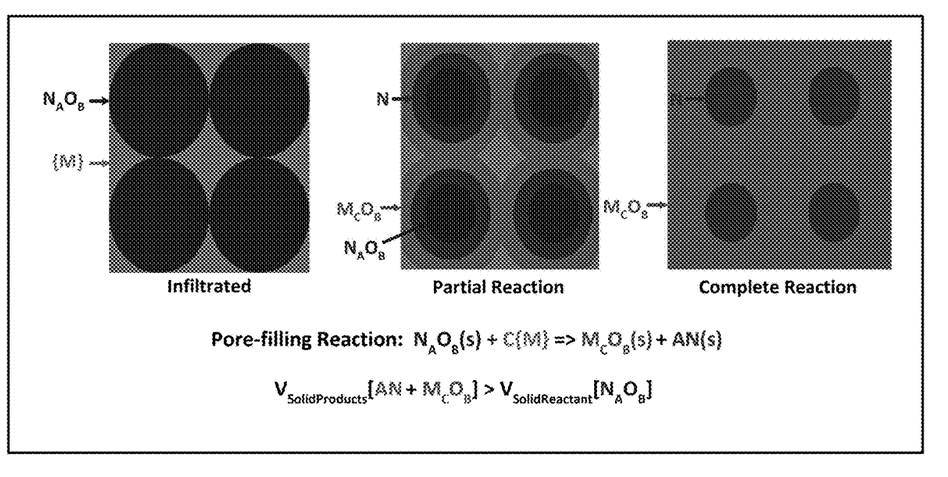
FIG. 1 is a schematic illustration of the Displacive Compensation of Porosity (DCP) process. A metal-bearing liquid, {M}, infiltrates into a porous oxide ($N_AO_B$) preform (left) and undergoes a pore-filling liquid/solid displacement reaction (middle) to yield a dense net-size $M_CO_B$/N cermet (right); Vi=volume of species i.

Briefly, DCP processes include synthesis or other acquisition of a porous preform with an appropriate composition, pore fraction, and overall shape. The pore fraction of the preform is tailored so that the reaction-induced increase in solid volume can compensate partially or completely for such porosity. It will be understood that the porous preform need only be sufficiently dimensionally stable to resist the capillary action of the infiltrated liquid reactant. The porous preform is infiltrated with a liquid reactant and the liquid reactant is allowed to react partially or completely with the solid preform to produce a dense, shaped body containing the desired ceramic phase(s). A phase is defined herein as a homogeneous volume of matter. This reaction is a displacement reaction of the following general type between a liquid species, {M}, and a solid shaped porous preform comprising the compound, $N_AO_B(s)$:

$$C\{M\} + N_AO_B(s) = M_CO_B(s) + AN(s)$$

where {M} refers to metal species in a liquid, $M_CO_B(s)$ is a corrosion-resistant solid oxide reaction product containing the metal species M, and N(s) is a corrosion-resistant solid metallic reaction product. A, B and C are molar coefficients. Reactions are chosen such that the solid product or products (i.e., AN(s) and/or $M_CO_B(s)$) possess a volume that is larger than the solid reactant, $N_AO_B(s)$. Such an increase in solid volume upon reaction is used to fill the prior pore spaces within the starting, shaped, porous $N_AO_B(s)$ preform; that is, the displacement reaction is used to compensate the prior pore volume (Displacive Compensation of Porosity).

The liquid species may be any metal(s) adapted to replace a displaceable species, N, of the solid shaped porous preform comprising the compound, $N_AO_B(s)$. The liquid species may comprise alkaline earth metal(s) including but not limited to magnesium, calcium, strontium, barium and mixtures thereof. Alternatively, the liquid species may comprise non-alkaline earth elements including but not limited to titanium, zirconium, hafnium, copper, and mixtures thereof. The liquid species (adapted to replace the displaceable species, N, of the solid shaped porous preform comprising the compound, $N_AO_B(s)$) may be contained within a liquid alloy. The composition of the liquid alloy may be chosen to have a liquidus temperature that is lower than the melting point of the pure metal species M.

The shaped porous preform comprising the compound, $N_AO_B(s)$, may be any oxide compound(s) adapted to contain the species to be displaced.

The DCP process may be used to synthesize a variety of ceramic/metal composite compositions. Composites with a range of ceramic and metal phase compositions may be produced by the DCP process provided that a thermodynamically-favored displacement reaction or reactions is/are utilized, and the volume of the solid product or products formed exceeds the volume of the solid reactant or reactants consumed.

The solid oxide reaction product, $M_CO_B(s)$ may be any corrosion-resistant oxide material including but not limited to oxide compounds, oxide solid solutions, or oxide mixtures. For instance, the solid oxide reaction product may be selected from the group consisting of the oxides of aluminum, antimony, barium, bismuth, boron, cadmium, calcium, cerium, cesium, chromium, cobalt, copper, indium, iron, hafnium, indium, lanthanum, lead, lithium, magnesium, manganese, molybdenum, niobium, nickel, phosphorus, potassium, silicon, sodium, strontium, tantalum, tin, titanium, vanadium, tungsten, yttrium, zinc, and zirconium and combinations thereof (e.g., oxide compounds, oxide solid solutions, or oxide mixtures).

The corrosion-resistant solid metallic reaction product, N(s), may be selected from the group containing metals, metal solid solutions, metal mixtures, and combinations thereof. For instance, the solid metallic reaction product, N(s), may include but is not limited to aluminum, chromium, cobalt, copper, hafnium, iron, manganese, molybdenum, nickel, niobium, silicon, tantalum, titanium, tungsten, vanadium, yttrium, zirconium, and combinations thereof (e.g., compounds, solid solutions, or mixtures of multiple metals).

In the nonlimiting example of oxide/metal composite components as a replacement for the pattern etched metallic alloy plates in printed circuit heat exchangers, the individual plates may be formed by producing a preform pressed into the desired plate shape (for example, pressing with stamped channel patterns), converting the preform into oxide/metal composite plates using the shape-preserving DCP process (preferably less than 1% dimensional change), and either simultaneously or subsequently joining pairs of the plates to one another and to headers and tubing of the heat exchanger.

This DCP process provides a cost-effective method for fabricating net-shape and net-size oxide/metal composites (i.e., without the sintering shrinkage encountered in conventional ceramics processing and without the need for appreciable costly machining, or chemical etching of metallic alloys). The resulting components may have high melting temperatures, may be mechanically robust, thermally robust, and chemically robust, and may be thermally and/or electrically conductive. As such, the application of such oxide/metal composite components formed by the DCP process to high-temperature systems provides significant advantages over conventional high-temperature metallic alloys or ceramic composites made by conventional methods. Cycle turbine inlet conditions of printed circuit heat exchangers are currently limited to about 550° C. at 20 MPa due to degradation in the mechanical behavior of conventional metal alloys at temperatures greater than about 600° C. By allowing for operation at inlet temperatures of greater than or equal to 800° C., it is expected that the heat exchangers as described herein will enable an increase in the power cycle efficiency from about 40% to about 55% at a materials cost of less than that of the structural metal alloys.

According to one aspect of the invention, an oxide/metal composite component for a high temperature system is prepared by a method that includes reacting a fluid comprising at least one displacing metal (liquid species, {M}) and a rigid, porous preform (compound, $N_AO_B(s)$) having a pore volume and comprising at least one displaceable species, wherein the displacing metal is capable of displacing the displaceable species. The fluid is allowed to infiltrate the preform such that the displacing metal at least partially replaces the displaceable species, so as to at least partially fill the pore volume and thereby produce the oxide composite component. The resulting component has an oxide portion having a volume greater than the volume of the preform from which the displaceable species is displaced.

According to another aspect of the invention, a method for producing an oxide/metal composite component for a high temperature system includes reacting a fluid comprising at least one displacing metal (liquid species, {M}) and a rigid, porous preform (compound, $N_AO_B(s)$) having a pore volume and comprising at least one displaceable species wherein the displacing metal is capable of displacing the displaceable species. The fluid is allowed to infiltrate the preform such that the displacing metal at least partially replaces the displaceable species, so as to at least partially fill the pore volume, and so as to produce the ceramic or ceramic composite component. The resulting component has an oxide portion having a volume greater than the volume of the preform from which the displaceable species is displaced.

According to yet another aspect of the invention, a high temperature system includes an oxide/metal composite component that is prepared by a method that includes reacting a fluid comprising at least one displacing metal (liquid species, {M}) and a rigid, porous preform (compound, $N_AO_B(s)$) having a pore volume and comprising at least one displaceable species, wherein the displacing metal is capable of displacing the displaceable species. The fluid is allowed to infiltrate the preform such that the displacing metal at least partially replaces the displaceable species, so as to at least partially fill the pore volume, and so as to produce the oxide composite component. The resulting component has an oxide portion having a volume greater than the volume of the preform from which the displaceable species is displaced.

Another preferred embodiment of the present invention is a co-continuous oxide/metal composite comprising a chromium-bearing metallic phase or phases and a titanium-oxide-bearing phase or phases. The chromium-bearing metallic phase or phases may be selected from the group containing chromium-bearing metal solid solutions, titanium-oxide-bearing metal mixtures, and combinations thereof. The titanium-oxide-bearing phase or phases may be selected from the group containing of titanium-oxide-bearing solid solutions, titanium-oxide-bearing mixtures, and combinations thereof.

Another preferred embodiment of the present invention is an oxide/metal composite comprising a chromium-bearing metallic phase or phases and a zirconium oxide-bearing phase or phases. The chromium-bearing metallic phase or phases may be selected from the group containing chromium-bearing metal solid solutions, chromium-bearing metal mixtures, and combinations thereof. The zirconium-oxide-bearing phase or phases may be selected from the group containing zirconium-oxide-bearing solid solutions, zirconium-oxide-bearing mixtures, and combinations thereof.

Another preferred embodiment of the present invention is an oxide/metal composite comprising a chromium-bearing metallic phase or phases and a hafnium-oxide-bearing phase or phases. The chromium-bearing metallic phase or phases may be selected from the group containing chromium-bearing metal solid solutions, chromium-bearing metal mixtures, and combinations thereof. The hafnium-oxide-bearing phase or phases may be selected from the group containing hafnium-oxide-bearing solid solutions, hafnium-oxide-bearing mixtures, and combinations thereof.

Another preferred embodiment of the present invention is an oxide/metal composite comprising a chromium-bearing metallic phase or phases and an oxide-bearing phase or phases. The chromium-bearing metallic phase or phases may be selected from the group containing chromium-bearing metal solid solutions, chromium-bearing metal mixtures, and combinations thereof. The oxide-bearing phase or phases may be selected from the group containing oxide-bearing solid solutions, oxide-bearing mixtures, and combinations thereof. The oxide-bearing phase or phases is or are selected to possess a thermal expansion values or coefficients that agree with the thermal expansion values or coefficients of the chromium-bearing metallic phase or phases within 10% over a desired temperature range. That is, the thermal expansion of the oxide-bearing and chromium-bearing phases are within 10% of one another when at the same temperatures.

Another preferred embodiment of the present invention is an oxide/metal composite comprising a chromium-bearing metallic phase or phases and an oxide-bearing phase or phases. The chromium-bearing metallic phase or phases may be selected from the group containing chromium-bearing metal solid solutions, chromium-bearing metal mixtures, and combinations thereof. The oxide-bearing phase or phases may be selected from the group containing oxide-bearing solid solutions, oxide-bearing mixtures, and combinations thereof. The oxide-bearing phase or phases is or are selected to possess a thermal expansion coefficient or coefficients that agree with the thermal expansion coefficient or coefficients of the chromium-bearing metallic phase or phases within 20% over a desired temperature range. That is, the thermal expansion of the oxide-bearing and chromium-bearing phases are within 20% of one another when at the same temperatures.

Another preferred embodiment of the present invention is an oxide/metal composite comprising a chromium-bearing metallic phase or phases and an oxide-bearing phase or phases. The chromium-bearing metallic phase or phases may be selected from the group containing chromium-bearing metal solid solutions, chromium-bearing metal mixtures, and combinations thereof. The oxide-bearing phase or phases may be selected from the group containing oxide-bearing solid solutions, oxide-bearing mixtures, and combinations thereof. The oxide-bearing phase or phases is or are selected to possess a thermal expansion coefficient or coefficients that agree with the thermal expansion coefficient or coefficients of the chromium-bearing metallic phase or phases within 50% over a desired temperature range. That is, the thermal expansion of the oxide-bearing and chromium-bearing phases are within 50% of one another when at the same temperatures.

Another preferred embodiment of the present invention is a ceramic/metal composite comprising nickel (Ni) and magnesium oxide (MgO). Such MgO/Ni composites possess an unusual and highly-attractive combination of high-temperature properties. MgO and Ni are high-melting materials ($T_{melting}$(MgO)=2827° C., $T_{melting}$(Ni)=1455° C.) that are oxidation resistant at elevated temperatures; that is, MgO is thermodynamically stable in oxygen-rich fluids at elevated temperatures and Ni forms a slow-growing, continuous, external NiO scale in oxygen-rich gases at or below about 750° C. Remarkably, unlike most ceramic/metal composites, MgO/Ni composites are thermally compatible; that is, these materials exhibit similar values of thermal expansion upon heating from room temperature (RT) to 750° C. (0.98% for MgO, 1.17% for Ni). Ni is also thermally conductive ($\alpha$=72.3 W/m-K at 750° C.). The estimated (rule of mixtures) thermal conductivity of a 63.1 vol % MgO/36.9 vol % Ni composite at 750° C. is 32.7 W/m-K, which is greater than values for stainless steels and Ni-based superalloys. MgO and Ni also possess complementary mechanical properties. While MgO is relatively stiff at elevated temperatures, Ni provides high-temperature ductility. Hence, a composite comprising Ni and an interconnected network of MgO should exhibit resistance to high-temperature creep and fracture.

Another preferred embodiment of the present invention is the use of the DCP process to fabricate a ceramic/metal composite comprising nickel (Ni) and magnesium oxide (MgO). To fabricate MgO/Ni-based composites with the DCP process, porous NiO preforms may first be generated in desired shapes via low-cost forming (e.g., pressing of NiO/binder mixtures, tape casting of NiO-bearing slurries). The porous NiO preforms can then be immersed in a bath of Mg liquid ($T_{melting}$(Mg)=650° C.) at ≥700° C. This Mg liquid can then infiltrate into the porous NiO preform and undergo the following thermodynamically-favored displacement reaction to yield a mixture of MgO (63.1 vol %) and Ni (36.9 vol %):

$$Mg(l)+NiO(s)=>MgO(s)+Ni(s) \qquad [2]$$

Because the solid products (1 mole of MgO+1 mole of Ni; with $V_m$(MgO)=11.3 cm³/mol, $V_m$(Ni)=6.6 cm³/mol) possess a combined volume that is 63% larger that the solid reactant (1 mole of NiO; with $V_m$(NiO)=11.0 cm³/mol), conversion of NiO into MgO/Ni results in solid filling of the internal pores within a rigid NiO body (reaction-induced densification without sintering), thereby forcing excess Mg liquid back out of the ceramic/metal composite.

Another preferred embodiment of the present invention is a ceramic/metal composite comprising iron (Fe) and magnesium oxide (MgO). Such MgO/Fe composites possess an unusual and highly-attractive combination of high-temperature properties. MgO and Fe are high-melting materials ($T_{melting}$(MgO)=2827° C., $T_{melting}$(Fe)=1538° C.). Remarkably, unlike most ceramic/metal composites, MgO/Fe composites are thermally compatible; that is, these materials exhibit similar values of thermal expansion upon heating from room temperature (RT) to 750° C. (0.98% for MgO, 1.10% for Fe). Fe is also thermally conductive ($\alpha$=31.6 W/m-K at 750° C.). The estimated (rule of mixtures) thermal conductivity of a 70.4 vol % MgO/29.6 vol % Fe composite at 750° C. is 16.0 W/m-K. MgO and Fe also possess complementary mechanical properties. While MgO is relatively stiff at elevated temperatures, Fe provides high-temperature ductility. Hence, a composite comprising Fe and an interconnected network of MgO should exhibit resistance to high-temperature creep and fracture.

Another preferred embodiment of the present invention is the use of the DCP process to fabricate a ceramic/metal composite comprising iron (Fe) and magnesium oxide (MgO). To fabricate MgO/Fe-based composites with the DCP process, porous $Fe_2O_3$ preforms may first be generated in desired shapes via low-cost forming (e.g., pressing of $Fe_2O_3$/binder mixtures, tape casting of $Fe_2O_3$-bearing slurries). The porous $Fe_2O_3$ preforms can then be immersed in a bath of Mg liquid ($T_{melting}$(Mg)=650° C.) at ≥700° C. This Mg liquid can then infiltrate into the porous $Fe_2O_3$ preform and undergo the following thermodynamically-favored displacement reaction to yield a mixture of MgO (70.4 vol %) and Fe (29.6 vol %):

$$3Mg(l)+Fe_2O_3(s) => 3MgO(s)+2Fe(s) \qquad [3]$$

Because the solid products (3 moles of MgO+2 moles of Fe; with $V_m$(MgO)=11.3 cm$^3$/mol, $V_m$(Fe)=7.1 cm$^3$/mol) possess a combined volume that is 59% larger that the solid reactant (1 mole of $Fe_2O_3$; with $V_m$($Fe_2O_3$)=30.3 cm$^3$/mol), conversion of $Fe_2O_3$ into MgO/Fe results in solid filling of the internal pores within a rigid $Fe_2O_3$ body (reaction-induced densification without sintering), thereby forcing excess Mg liquid back out of the ceramic/metal composite.

Another preferred embodiment of the present invention is a ceramic/metal composite comprising nickel-chromium (Ni—Cr) alloy and magnesium oxide (MgO). Such MgO/Ni—Cr composites possess an unusual and highly-attractive combination of high-temperature properties. MgO and Ni—Cr are high-melting materials ($T_{melting}$(MgO)=2827° C., $T_{solidus}$(Ni—Cr)≥1345° C.) that are oxidation resistant at elevated temperatures; that is, MgO is thermodynamically stable in oxygen-rich fluids at elevated temperatures and Ni—Cr alloys (such as solid solutions of Ni with ≥20 wt % Cr) can form slow-growing, continuous, external $Cr_2O_3$-rich scales in oxidizing gases at or below 750° C. Remarkably, unlike most ceramic/metal composites, MgO/Ni—Cr composites can be thermally compatible; that is, these materials can exhibit similar values of thermal expansion upon heating from room temperature (RT) to 750° C. (0.98% for MgO, 1.20% for a 80 wt % Ni-20 wt % Cr solid solution). Ni—Cr alloys are also thermally conductive (α=27.4 W/m-K at 750° C. for a 80 wt % Ni-20 wt % Cr solid solution). The estimated (rule of mixtures) thermal conductivity of a 62.6 vol % MgO/37.4 vol % Ni-20 wt % Cr composite at 750° C. is 16.1 W/m-K. MgO and Ni—Cr alloys also possess complementary mechanical properties. While MgO is relatively stiff at elevated temperatures, Ni—Cr alloys provide high-temperature ductility. Hence, a composite comprising Ni—Cr alloy and an interconnected network of MgO should exhibit resistance to high-temperature creep and fracture.

Another preferred embodiment of the present invention is the use of the DCP process to fabricate a ceramic/metal composite comprising a nickel-chromium (Ni—Cr) alloy and magnesium oxide (MgO). To fabricate MgO/Ni—Cr-based composites with the DCP process, porous preforms containing NiO and $Cr_2O_3$ may first be generated in desired shapes via low-cost forming (e.g., pressing of NiO—$Cr_2O_3$/binder mixtures, tape casting of NiO—$Cr_2O_3$-bearing slurries). The porous NiO—$Cr_2O_3$ preforms can then be immersed in a bath of Mg liquid ($T_{melting}$(Mg)=650° C.) at ≥700° C. This Mg liquid can then infiltrate into the porous NiO—$Cr_2O_3$ preform and undergo the following thermodynamically-favored displacement reaction to yield a mixture of MgO (62.6 vol %) and Ni-20 wt % Cr alloy (32.4 vol %):

$$1.11Mg(l)+0.78NiO(s)+0.11Cr_2O_3(s) => 1.11MgO(s)+Ni_{0.78}Cr_{0.22}(s) \qquad [4]$$

(Note: a 80 wt % Ni/20 wt % Cr alloy is equivalent to a 78.0 at % Ni/22.0 at % Cr alloy) Because the solid products (1.11 moles of MgO+1 mole of $Ni_{0.78}Cr_{0.22}$ alloy; with $V_m$(MgO)=11.3 cm$^3$/mol, $V_m$($Ni_{0.78}Cr_{0.22}$ alloy)=6.7 cm$^3$/mol) possess a combined volume that is 63% larger that the solid reactants (0.780 moles of NiO+0.110 moles of $Cr_2O_3$; with $V_m$(NiO)=11.0 cm$^3$/mol and $V_m$($Cr_2O_3$)=29.1 cm$^3$/mol), conversion of NiO into a MgO/Ni-20Cr alloy composite results in solid filling of the internal pores within a rigid NiO—$Cr_2O_3$ preform body (reaction-induced densification without sintering), thereby forcing excess Mg liquid back out of the ceramic/metal composite.

Another preferred embodiment of the present invention is a ceramic/metal composite comprising nickel-chromium-bearing (Ni—Cr-bearing) alloy and magnesium oxide (MgO).

Another preferred embodiment of the present invention is a ceramic/metal composite comprising iron-chromium (Fe—Cr) alloy and magnesium oxide (MgO).

Another preferred embodiment of the present invention is a ceramic/metal composite comprising iron-chromium-bearing (Fe—Cr-bearing) alloy and magnesium oxide (MgO).

Another preferred embodiment of the present invention is an oxide/metal composite comprising one or more metal phases and one or more oxide phases that has high-temperature capability due to the selection of oxide and metal phases that each possess a high melting point and that together possess a high solidus (onset of liquid formation) temperature, high-temperature resistance to corrosion due to the selection of oxide and metal phases that are each resistant to oxidation (such as in the presence of oxygen-bearing gases or liquids at elevated temperatures) and to corrosion in reactive fluids, high thermal cyclability due to the selection of oxide and metal phases that possesses similar values of thermal expansion coefficients (e.g., CTEs or thermal expansion values that agree to within 10% of each other), high thermal conductivity due to the selection of a continuous (interconnected) metal phase or metal phases that is or are thermally conductive, high electrical conductivity due to the selection of a continuous (interconnected) metal phase or metal phases that is or are electrically conductive, high-temperature stiffness and creep resistance due to the selection of one or more continuous (interconnected) oxide phase or phases that is or are stiff and creep resistant at high temperature and or the selection of one or more continuous interconnected) metal phase or phases that is or are stiff and creep resistant at high temperature, and high toughness due to the selection of one or more metal phase or phases that is or are ductile at room temperature and/or at elevated temperature.

Preferred embodiments of the present invention include compact millichanneled heat exchangers comprising of high-temperature oxide/metal composite materials having heat transfer capabilities suitable for use in Brayton power cycles with supercritical carbon dioxide at 800° C. or more. The oxide/metal composite components used in the heat exchangers have high melting temperatures, are thermally conductive, are stiff and creep resistant, and are comprising corrosion-resistant materials with similar thermal expansion coefficients.

Preferred embodiments of the present invention include high-temperature engine components comprising of high-temperature oxide/metal composite materials having high melting temperatures and that are thermally conductive, stiff and creep resistant, and comprising corrosion-resistant materials with similar thermal expansion coefficients.

Preferred embodiments of the present invention include high-temperature pump components comprising of high-temperature oxide/metal composite materials having high melting temperatures and that are thermally conductive, stiff and creep resistant, and comprising corrosion-resistant materials with similar thermal expansion coefficients.

Another preferred embodiment of the present invention is an Oxidation-Resistant, CTE-Matched, Robust Oxide/Metal-Based pHEXs for effective, reliable heat transfer at ≥750° C. from molten chlorides to $sCO_2$ for significantly higher thermal-to-electrical energy conversion in the CSP power block than is possible with current metal alloy-based pHEXs. Materials for such pHEXs include but are not limited to co-continuous $Al_2O_3$/Cr (alumina/chromium) and MgO/Fe—Cr (magnesia/iron-chromium alloy) cermets. These cermets offer unusual and highly-attractive combinations of properties for pHEXs, including high-temperature (≥750° C.) creep and fracture resistance, oxidation resistance, and thermal cycling resistance. Regarding mechanical behavior, $Al_2O_3$ and MgO are high-melting (2047° C. and 2827° C., respectively), Oxidation-Resistant, CTE-Matched, Robust Oxide/Metal-Based pHEXs. Hence, composites containing interconnected networks of both oxide and metal phases can possess enhanced resistance to creep (relative to conventional metal alloys) and enhanced resistance to fracture (relative to monolithic ceramics). Indeed, $Al_2O_3$/Ni-20 wt % Cr cermets with an interconnected $Al_2O_3$ matrix (formed by squeeze casting Ni—Cr liquid into a 50% porous $Al_2O_3$ preform) have exhibited no detectable creep at 1000° C. at 20 MPa loading. Hot-pressed $Al_2O_3$/Cr (64/36 vol %) and MgO/Fe—Ni—Cr (54/46 vol %) cermets have exhibited fracture strengths of 440 MPa and 316 MPa, respectively, at 25° C. Reaction-formed (DCP) MgO/$Fe_{0.6}Al_{0.4}$ (61/39 vol %) cermets has exhibited fracture strengths in excess of 420 MPa at 934° C.[16] Regarding oxidation behavior, the resistance of Cr and Fe—Cr alloys (with ≥25 wt % Cr) to corrosion at 750° C. in air and in $CO_2$ can enable $Al_2O_3$/Cr and MgO/Fe—Cr cermets to be oxidation resistant. Indeed, dense (hot-pressed) $Al_2O_3$/Cr and MgO/Fe—Cr cermets have been found to exhibit slow parabolic oxidation kinetics in $CO_2$ at 750° C. Regarding thermal properties, estimated (rule of mixtures) thermal conductivities of $Al_2O_3$/Cr (64/36 vol %) and MgO/Fe—Cr (54/46 vol %) cermets are 28 and 15 W/m-K at 750° C., respectively (not far from 23.4 W/m·K for Haynes 230 alloy). Remarkably, unlike most cermets, $Al_2O_3$/Cr and MgO/Fe—Cr composites are thermally compatible; that is, the oxide and metal phases exhibit similar values of thermal expansion from 20° C. to 750° C. (0.63% for $Al_2O_3$ vs. 0.71% for Cr; and 0.98% for MgO vs. 0.94% for Fe—Cr with 25 wt % Cr). Furthermore, compared to prior low-expansion ZrC/W cermets, these new oxide/metal cermets possess thermal expansion values relatively close to Ni alloys for CSP piping (e.g., 1.1% expansion for H230 from 20° C. to 750° C.).

$$2\{Al\}+Cr_2O_3 => Al_2O_3+2Cr \qquad [5]$$

$$3\{Mg\}+(Fe_xCr_y)_2O_3 => 3MgO+2(Fe_xCr_y) \qquad [6]$$

where { } refers to an Al-bearing or Mg-bearing melt, and ($Fe_xCr_y$) refers to a solid Fe—Cr alloy. For reaction [5], Al-bearing liquid will be infiltrated into porous $Cr_2O_3$ preforms, whereas Mg-bearing liquid will be infiltrated into ($Fe_xCr_y$)$_2O_3$-bearing preforms for reaction [6]. Because the solid products of reaction [5] ($Al_2O_3$+2Cr) and reaction [6] (3MgO+2Fe—Cr alloy) possess combined volumes that are 38% and 60% larger, respectively, than the volumes of the solid reactants ($Cr_2O_3$ for reaction [5]; ($Fe_xCr_y$)$_2O_3$ for reaction [6]), conversion of $Cr_2O_3$-bearing and ($Fe_xCr_y$)$_2O_3$-bearing preforms into $Al_2O_3$/Cr and MgO/Fe—Cr, respectively, can result in solid filling of internal pores within the rigid preform bodies (reaction-induced densification without sintering), thereby forcing residual liquid back out of the cermet. Prior work with the DCP process (using internal volume-increasing displacement reactions to fill pores) has shown that porous oxide-bearing preforms can be converted into dense wall oxide/metal cermets (MgO/FeAl, $MgAl_2O_4$/FeNiAl) that retain the preform shapes and dimensions (fractional changes ≤0.007).

In certain embodiments, the pHEXs containing co-continuous oxide/metal composites have the following properties: <30 μm of recession per year from corrosion in $sCO_2$ and in molten chloride at ≥750° C.; creep rupture life >30 years at ≥750° C. at 25 MPa; fracture strength >300 MPa at ≥750° C.; pHEX designed for power density ≥1 MW/m³ and pressure drop values ≤100 kPa; and pHEX cost <$0.05/W.

Regarding corrosion in molten $MgCl_2$—KCl, the following reactions of $Al_2O_3$ and MgO with chloride species are highly thermodynamically unfavored:

$$Al_2O_3+3MgCl_2 => 3MgO+2AlCl_3 \qquad [7]$$

$$Al_2O_3+6KCl => 3K_2O+2AlCl_3 \qquad [8]$$

$$MgO+2KCl => K_2O+MgCl_2 \qquad [9]$$

However, $MgCl_2$ may react with oxygen dissolved in the chloride melt, {O}, to generate reactive chlorine, {Cl}, in the melt that can then react with Cr as shown below:

$$MgCl_2+\{O\}=MgO+2\{Cl\} \qquad [10]$$

$$Cr+2\{Cl\}=CrCl_2 \qquad [11]$$

Reaction of Cr with $MgCl_2$-bearing melts may be minimized by using a gettering agent to remove oxygen from such melts (to drive reaction [10] to the left to minimize {Cl} formation). The cermet surfaces can also be pre-treated (oxidized) to form $Cr_2O_3$ that is diffusion bonded and mechanically interlocked with $Al_2O_3$ or MgO phases. The following reactions of $Cr_2O_3$ with $MgCl_2$ or KCl are highly thermodynamically unfavored at 750° C.:

$$Cr_2O_3+2MgCl_2=2MgO+2CrCl_2+\tfrac{1}{2}O_2(g) \qquad [12]$$

$$Cr_2O_3+4KCl=2K_2O+2CrCl_2+\tfrac{1}{2}O_2(g) \qquad [13]$$

Polycrystalline $Al_2O_3$ and MgO are highly creep resistant at 750° C. at ≤25 MPa, so co-continuous $Al_2O_3$/Cr and MgO/Fe—Cr cermets should be highly resistant to creep rupture under these conditions. Regarding fracture strength, other reaction-formed (DCP-derived) co-continuous oxide/metal alloy cermets (e.g., MgO/$Fe_{0.6}Al_{0.4}$) have exhibited strengths well above 300 MPa at >750° C. Regarding HEX performance, prior analyses with ZrC/W cermets, also with high creep resistance and similar fracture strength (>300 MPa) at ≥750° C., have shown that the reduction in plate thickness enabled by such enhanced mechanical performance enables the design of pHEXs with power densities ≥1 MW/m³ and pressure drop values ≤100 kPa. Using the DCP-based processes, the oxide/metal-based HEXs disclosed herein are predicted to have a scaled-up manufacturing costs of well below $0.037/W.

While the invention has been described in terms of specific or particular embodiments, it should be apparent that alternatives could be adopted by one skilled in the art. For example, the components could have different compositions than those described herein, process parameters such as temperatures and durations could be modified, and appropriate materials could be substituted for those noted. Accordingly, it should be understood that the invention is not necessarily limited to any embodiment described herein. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A method for producing an oxide/metal composite component for use in a high temperature system, the method comprising:
providing a fluid reactant and a porous preform that has a pore volume and contains a solid oxide reactant that defines a solid volume of the porous preform, the fluid reactant comprising at least one displacing metal and the solid oxide reactant of the preform having at least one displaceable species;
allowing the fluid reactant to infiltrate the porous preform and react with the solid oxide reactant to produce the oxide/metal composite component, during which the at least one displacing metal at least partially replaces the at least one displaceable species of the solid oxide reactant to produce at least one solid metallic reaction product and at least one solid oxide reaction product, the at least one solid metallic reaction product forming at least one metal phase of the oxide/metal composite component that contains the at least one displaceable species, the at least one solid oxide reaction product forming at least one oxide phase of the oxide/metal composite component that contains an oxide of the at least one displacing metal, wherein the at least one solid oxide reaction product has a reaction product volume, the pore volume is at least partially filled by the solid oxide reaction product and the reaction product volume is greater than the solid volume of the solid oxide reactant that is lost as a result of the at least one displaceable species in the solid oxide reactant being displaced by the at least one displacing metal of the fluid reactant during the reaction of the fluid reactant and the solid oxide reactant, wherein the oxide/metal composite component comprises an oxide/metal composite containing the at least one oxide phase and the at least one metal phase; and
exposing the oxide/metal composite component to temperatures greater than 500° C. in the high temperature system, wherein the at least one oxide phase and the at least one metal phase exhibit thermal expansion values within 20% of one another at a temperature greater than 500° C.

2. The method of claim 1, wherein the at least one metal phase is selected from the group consisting of at least one metal, at least one metal-bearing solid solution, and at least one metal-bearing compound, and the at least one oxide phase is selected from the group consisting of at least one oxide, at least one oxide-bearing solid solution, and at least one oxide-bearing compound.

3. The method of claim 1, wherein the at least one displaceable species is at least one metal selected from the group consisting of aluminum, chromium, cobalt, copper, hafnium, iron, manganese, molybdenum, nickel, niobium, silicon, tantalum, titanium, tungsten, vanadium, yttrium, zirconium, or any combination thereof.

4. The method of claim 1, wherein the oxide of the at least one displacing metal is at least one oxide selected from the group consisting of the oxides of aluminum, antimony, barium, boron, calcium, cerium, cesium, chromium, cobalt, indium, iron, hafnium, indium, lanthanum, lithium, magnesium, manganese, molybdenum, niobium, nickel, phosphorus, potassium, silicon, sodium, strontium, tantalum, titanium, vanadium, tungsten, yttrium, zinc, and zirconium.

5. The method of claim 1, wherein the oxide/metal composite is selected from the group consisting of chromium-bearing/aluminum oxide-bearing composites, chromium-bearing/titanium oxide-bearing composites, chromium-bearing/zirconium oxide-bearing composites, chromium-bearing/hafnium oxide-bearing composites, nickel-bearing/magnesium oxide-bearing composites, iron-bearing/magnesium oxide-bearing composites, cobalt-bearing/magnesium oxide-bearing composites, manganese-bearing/magnesium oxide-bearing composites, and copper-bearing/magnesium oxide-bearing composites.

6. The method of claim 1, wherein the oxide/metal composite component is installed in the high temperature system, and the high temperature system is chosen from the group consisting of transportation, energy (e.g., electrical power) production, energy storage, waste heat recovery, propulsion, national defense, chemical processing, and chemical and waste storage systems.

7. The method of claim 6, wherein the high temperature system is a transportation system chosen from the group consisting of automobiles, trucks, trains, aircraft, spacecraft, ships, and submarines.

8. The method of claim 6, wherein the high temperature system is an electrical power production system chosen from the group consisting of fossil fuel-derived power, solar energy-derived power, nuclear energy-derived power, and thermionics systems.

9. The method of claim 6, wherein the high temperature system is an energy storage system that stores solids, liquids, gases, or plasmas.

10. The method of claim 6, wherein the high temperature system is a propulsion system chosen from the group consisting of chemical fuel-based propulsion, nuclear fuel-based propulsion, and ion propulsion systems.

11. The method of claim 6, wherein the high temperature system is a national defense system chosen from the group consisting of hypersonic aircraft and hypersonic missiles.

12. The method of claim 1, wherein the oxide/metal composite component is a component of a high temperature system chosen from the group consisting of heat exchangers, piping, valves, storage containers for high-temperature solids and fluids, pumps, bearings, gears, wheels, pulleys, heat sinks, liquid metal handling equipment, engine components, components in drive trains, machining tools, grinding tools, welding tools, and components in braking systems, leading edges of hypersonic aircraft and missiles, and energy conversion devices.

13. The method of claim 1, wherein the solid oxide reactant of the porous preform comprises an oxide of chromium and the at least one solid metallic reaction product and the at least one displaceable metal thereof each comprise chromium, and/or the at least one displacing metal comprises aluminum and the at least one solid oxide reaction product and the oxide of the at least one displacing metal thereof each comprise at least one oxide of aluminum.

14. The method of claim 1, wherein the at least one oxide phase and the at least one metal phase exhibit thermal expansion values are within 10% of one another at a temperature greater than 500° C.

15. The method of claim 14, wherein the at least one metal phase is selected from the group consisting of at least one metal, at least one metal-bearing solid solution, and at least one metal-bearing compound, and the at least one oxide phase is selected from the group consisting of at least one oxide, at least one oxide-bearing solid solution, and at least one oxide-bearing compound.

16. The method of claim 14, wherein the at least one displaceable species is at least one metal selected from the group consisting of aluminum, chromium, cobalt, copper, hafnium, iron, manganese, molybdenum, nickel, niobium, silicon, tantalum, titanium, tungsten, vanadium, yttrium, zirconium, or any combination thereof.

17. The method of claim 14, wherein the oxide of the at least one displacing metal is at least one oxide selected from the group consisting of the oxides of aluminum, antimony, barium, boron, calcium, cerium, cesium, chromium, cobalt, indium, iron, hafnium, indium, lanthanum, lithium, magnesium, manganese, molybdenum, niobium, nickel, phosphorus, potassium, silicon, sodium, strontium, tantalum, titanium, vanadium, tungsten, yttrium, zinc, and zirconium.

18. The method of claim 14, wherein the oxide/metal composite is selected from the group consisting of chromium-bearing/aluminum oxide-bearing composites, chromium-bearing/titanium oxide-bearing composites, chromium-bearing/zirconium oxide-bearing composites, chromium-bearing/hafnium oxide-bearing composites, nickel-bearing/magnesium oxide-bearing composites, iron-bearing/magnesium oxide-bearing composites, cobalt-bearing/magnesium oxide-bearing composites, manganese-bearing/magnesium oxide-bearing composites, and copper-bearing/magnesium oxide-bearing composites.

19. The method of claim 14, wherein the high temperature system is for transportation, energy (e.g., electrical power) production, energy storage, waste heat recovery, propulsion, national defense, chemical processing, and chemical and waste storage.

20. The oxide/metal composite component of claim 1.

* * * * *

UNITED STATES PATENT AND TRADEMARK OFFICE
CERTIFICATE OF CORRECTION

| | |
|---|---|
| PATENT NO. | : 11,352,681 B2 |
| APPLICATION NO. | : 16/503117 |
| DATED | : June 7, 2022 |
| INVENTOR(S) | : Kenneth H. Sandhage et al. |

It is certified that error appears in the above-identified patent and that said Letters Patent is hereby corrected as shown below:

In the Specification

Column 1, Line 13, please insert the following paragraph:
-- STATEMENT REGARDING FEDERALLY SPONSORED RESEARCH OR DEVELOPMENT
This invention was made with government support under DE-EE0008527 awarded by the Department of Energy. The government has certain rights in the invention. --

Signed and Sealed this
Twenty-ninth Day of November, 2022

Katherine Kelly Vidal
*Director of the United States Patent and Trademark Office*